(12) United States Patent
Shirinfar et al.

(10) Patent No.: US 8,918,064 B2
(45) Date of Patent: Dec. 23, 2014

(54) ON-CHIP DISTRIBUTED POWER AMPLIFIER AND ON-CHIP OR IN-PACKAGE ANTENNA FOR PERFORMING CHIP-TO-CHIP AND OTHER COMMUNICATIONS

(71) Applicant: Broadcom Corporation, Irvine, CA (US)

(72) Inventors: Farid Shirinfar, Los Angeles, CA (US); Med Nariman, Irvine, CA (US); Maryam Rofougaran, Rancho Palos Verdes, CA (US); Ahmadreza Rofougaran, Newport Coast, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/628,488

(22) Filed: Sep. 27, 2012

(65) Prior Publication Data

US 2014/0087676 A1 Mar. 27, 2014

(51) Int. Cl.
*H04B 1/02* (2006.01)

(52) U.S. Cl.
USPC .......... 455/91; 455/107; 455/111; 455/115.1; 455/124; 330/51; 330/195

(58) Field of Classification Search
CPC ...... H03F 3/195; H03F 2200/411; H04B 1/02
USPC ............ 455/91, 107, 111, 115.1, 124, 127.3, 455/129; 330/51, 124 R, 195
See application file for complete search history.

(56) References Cited

U.S. PATENT DOCUMENTS

| | | | |
|---|---|---|---|
| 7,728,661 B2 * | 6/2010 | Bockelman et al. ............ 330/51 |
| 2007/0225033 A1 * | 9/2007 | Yoon et al. ................. 455/552.1 |
| 2008/0079652 A1 * | 4/2008 | Mohamadi .................... 343/893 |
| 2010/0237974 A1 * | 9/2010 | Yoon et al. .................... 336/170 |

* cited by examiner

*Primary Examiner* — Tuan Pham
(74) *Attorney, Agent, or Firm* — Sterne, Kessler, Goldstein & Fox P.L.L.C.

(57) ABSTRACT

A transmitter front-end for wireless chip-to-chip communication, and potentially for other, longer range (e.g., several meters or several tens of meters) device-to-device communication, is disclosed. The transmitter front-end includes a distributed power amplifier capable of providing an output signal with sufficient power for wireless transmission by an on-chip or on-package antenna to another nearby IC chip or device located several meters or several tens of meters away. The distributed power amplifier can be fully integrated (i.e., without using external components, such as bond wire inductors) on a monolithic silicon substrate using, for example, a complementary metal oxide semiconductor (CMOS) process.

20 Claims, 7 Drawing Sheets

US 8,918,064 B2

ON-CHIP DISTRIBUTED POWER AMPLIFIER AND ON-CHIP OR IN-PACKAGE ANTENNA FOR PERFORMING CHIP-TO-CHIP AND OTHER COMMUNICATIONS

FIELD OF THE INVENTION

This application relates generally to wireless communication and, more specifically, to wireless chip-to-chip communication and other, longer range, communication.

BACKGROUND

Many devices today include multiple integrated circuit (IC) chips to carry out their designed for functionalities. These IC chips often need to communicate with each other at very high data rates. For example, complex devices can include several IC chips on a printed-circuit board (PCB) that are required to communicate with each other at rates exceeding several gigabits per second (Gb/s), and these rates continue to increase with each new generation of devices. At such high rates, communication over electrical traces on a PCB becomes difficult due to, for example, impedance mismatches, the skin effect, and dielectric absorption, all of which lead to distortion and/or attenuation of a transmitted signal. Moreover, depending on the number of IC chips used, routing of electrical traces between the IC chips can be difficult on a PCB with limited area.

Wireless communication can be used to overcome the problems of electrical interconnection described above. For example, wireless communication is generally not constrained by PCB area limitations and enough unlicensed wireless spectrum exists to accommodate high data rates in the multi Gb/s range. In particular, there is 7 GHz of spectrum available for unlicensed wireless communication in the 60 GHz band, from 57-64 GHz in the United States and Canada and from 59-66 GHz in Japan. This spectrum can be used to accommodate high data rate wireless chip-to-chip communications in the multi Gb/s range.

However, for any such wireless chip-to-chip communication solution, and potentially for other, longer range, communication solutions (e.g., several meters or several tens of meters) for device-to-device communication, it is desirable that the required hardware be compact and cheap. Current solutions for wireless chip-to-chip and device-to-device communication typically fail to achieve one or both of these often competing criteria by using off-chip components and/or expensive IC processes, such as Gallium Arsenide (GaAs).

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

The embodiments of the present disclosure will be described with reference to the accompanying drawings. The drawing in which an element first appears is typically indicated by the leftmost digit(s) in the corresponding reference number.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

1. Overview

The present disclosure is directed to a transmitter front-end for wireless chip-to-chip communication, and potentially for other, longer range communications (e.g., several meters or several tens of meters) between devices. The transmitter front-end can be implemented in an IC chip and includes a distributed power amplifier capable of providing an output signal with sufficient power for wireless transmission by an on-chip or on-package antenna to another IC chip or device. As used herein, "on-chip" means on or within the substrate of the IC chip, and "on-package" means on or within the package used to hold or contain the substrate of the IC chip. The distributed power amplifier can be fully integrated (i.e., without using external components, such as bond wire inductors) on a monolithic silicon substrate using, for example, a complementary metal oxide semiconductor (CMOS) process.

The on-chip antenna can be implemented as a phased array of antennas such that the effective radiation pattern of the phased array of antennas is reinforced in a desired direction and suppressed in an undesired direction. This helps to reduce the required output power of the distributed power amplifier and mitigate interference with other potential wireless chip-to-chip communications. As an alternative, an on-package antenna with a higher radiation efficiency can be used in place of the on-chip antenna, which typically has a comparatively lower radiation efficiency due to the low resistivity of many IC substrates, such as silicon.

Figure 1:
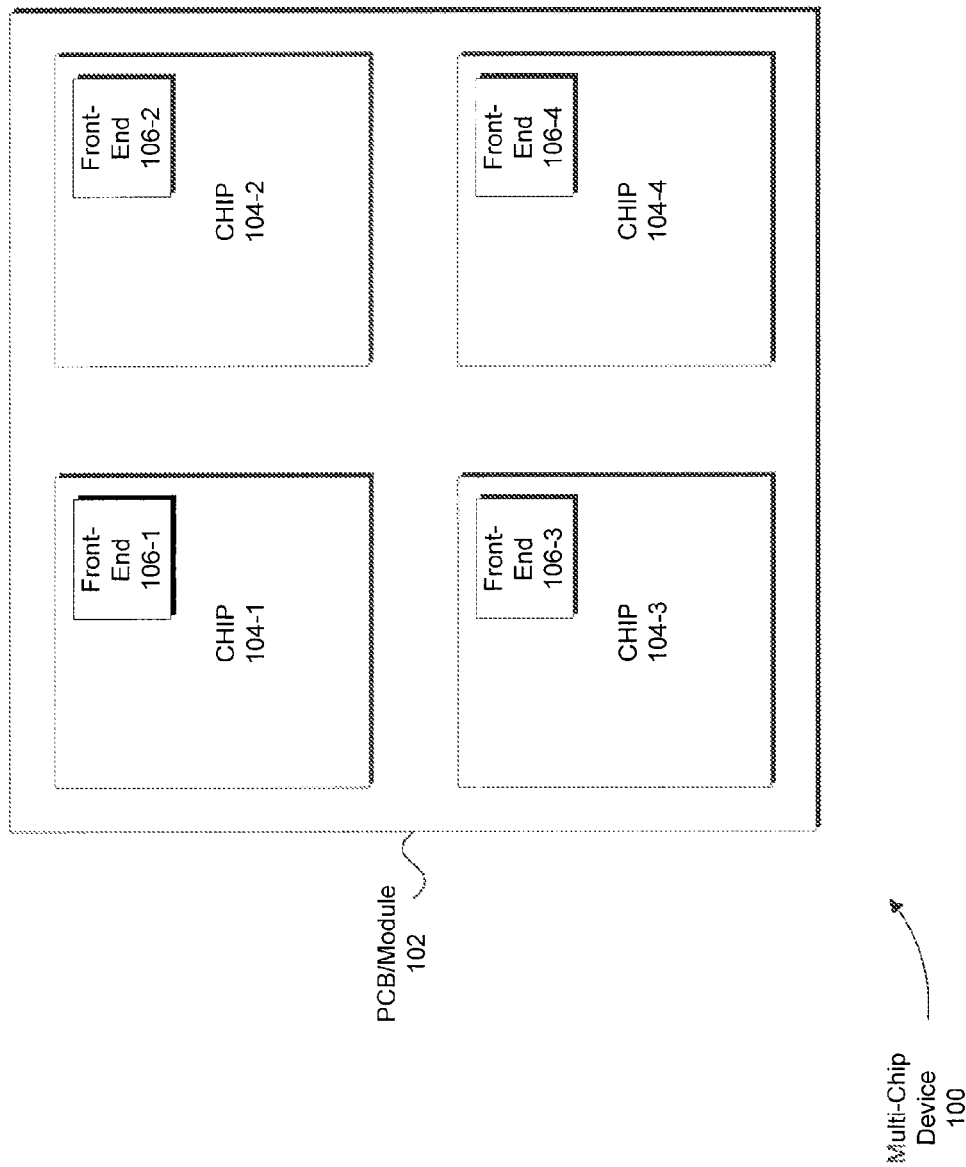
FIG. 1 illustrates a multi-chip device in which embodiments of the present disclosure can operate.

FIG. 1 illustrates an exemplary multi-chip device 100 in which embodiments of the transmitter front-end described above can be implemented. Multi-chip device 100 can be, for example, a desktop computer, a laptop, a smart phone, a set-top box, or a gaming system. As shown in FIG. 1, multi-chip device 100 includes a PCB or a module (e.g., a box) 102 containing multiple IC chips 104-1 through 104-4. In the multi-chip device 100, the IC chips 104-1 through 104-4 are required to communicate with each other at high data rates (e.g., in the multi Gb/s range) in order to carry out the designed for functionalities of the multi-chip device 100. However, other data rates (e.g., below a Gb/s) are also possible. It should be noted that, in other embodiments, chips 104-1 through 104-4 can be implemented in separate devices (as opposed to being contained on the same PCB, or in the same module, of a device) and can be required to communicate with each other (or other devices) at distances of several meters or several tens of meters, for example.

In order to perform inter-chip communications, each IC chip 104-1 through 104-4 includes a respective transmitter front-end 106-1 through 106-4. These transmitter front-ends 106-1 through 106-4 are configured to amplify the power of a signal with a carrier frequency in the range of 30 to 300 GHz or above. The signal to be amplified can be modulated with data intended for reception by another one of the IC chips 104-1 through 104-4. Signals with frequencies in the range 30 to 300 GHz have a wavelength of ten to one millimeter and are often referred to as millimeter wave signals. At these small wave lengths, a small length on-package or even on-chip antenna can be used to wirelessly transmit the amplified modulated signal to another one of the IC chips 104-1 through 104-4.

In one embodiment, the transmitter front-ends 106-1 through 106-4 are configured to amplify a modulated signal with a carrier frequency in the range of 57-64 GHz if the multi-chip device 100 is intended for operation in the United States or Canada. In another embodiment, the transmitter front-ends 106-1 through 106-4 are configured to amplify a modulated signal with a carrier frequency in the range 59-66 GHz if the multi-chip device 100 is intended for operation in Japan.

A distributed power amplifier (not shown) is specifically included in each transmitter front-end 106-1 through 106-4 to amplify the power of the modulated signal before being wirelessly transmitted. The distributed power amplifiers each include a plurality of power amplifiers for amplifying the power of the modulated signal and a power combiner for combining the output signal power of the plurality of power amplifiers. Distributing the power amplifiers and then combining their respective output signal powers allows the distributed power amplifier to be fully integrated on-chip using, for example, a sub-micrometer CMOS process, while still providing sufficient output power without breaking down devices (e.g., transistors) used to implement the individual power amplifiers. This is because each of the plurality of power amplifiers need only supply a fraction of the total power. The power combiner can be further used to perform an impedance transformation, such that the output impedances of the plurality of power amplifiers substantially match the impedance of the antenna (also not shown) to which the power combiner is coupled.

The antenna is used to wirelessly transmit the modulated signal and can be either implemented on-chip or on-package. When implemented on-chip, a phased array of antennas can be used such that the effective radiation pattern of the phased array of antennas is reinforced in a desired direction and suppressed in an undesired direction. This helps to reduce the required output power of the distributed power amplifier and mitigate interference with other potential wireless chip-to-chip communications.

To prevent collisions and to effectively share the available wireless bandwidth between the IC chips 104-1 through 104-4, one of the IC chips can be configured to act as a master device to coordinate transmissions from the other IC chips, configured as slave devices. For example, the IC chip 104-1 can acts as a master device to coordinate transmissions from the other IC chips, such that the available wireless bandwidth is effectively shared between them and collisions are avoided. The master IC chip can grant access to the available wireless bandwidth to each slave IC chip for a limited interval of time—the duration of which can be determined based on an amount of data that is waiting to be wirelessly transmitted by each slave IC chip. In other embodiments, a contention based media access control protocol can be implemented by the IC chips 104-1 through 104-4 to perform wireless chip-to-chip communication. For example, a contention based media access control protocol similar to carrier sense multiple access used in Ethernet can be used. In yet another embodiment, the IC chips 104-1 through 104-4 are assigned non-overlapping transmission bandwidths over which wireless chip-to-chip communication can be performed.

Figure 2:
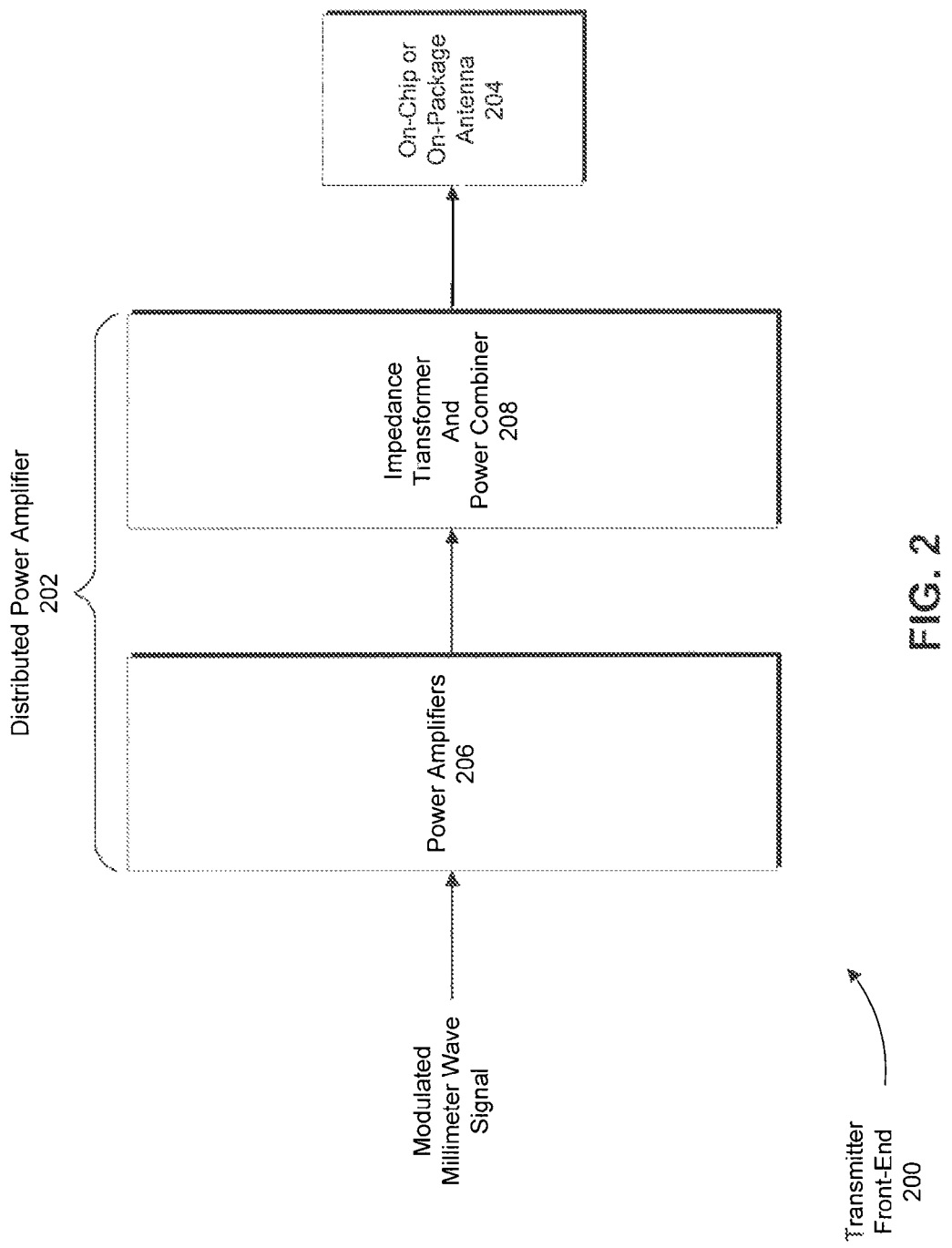
FIG. 2 illustrates a block diagram of a transmitter front-end in accordance with embodiments of the present disclosure.

Referring now to FIG. 2, a block diagram of a transmitter front-end 200 is illustrated. The transmitter front-end 200 can be used, for example, to implement one or more of the transmitter front-ends 106-1 through 106-4 in FIG. 1. As shown in FIG. 2, the transmitter front-end 200 includes a distributed power amplifier 202 and an on-chip or on-package antenna 204. The distributed power amplifier 202 specifically includes a plurality of power amplifiers 206 and an impedance transformer and power combiner 208.

In operation, the plurality of power amplifiers 206 are each configured to independently amplify the power of a signal with a carrier frequency in the range of 30 to 300 GHz or above. The signal to be amplified can be modulated with data intended for reception by a nearby IC chip. Signals with frequencies in the range 30 to 300 GHz have a wavelength of ten to one millimeter and, as noted above, are often referred to as millimeter wave signals. Thus, as shown in FIG. 2, the power amplifiers 206 receive and amplify the power of a signal designated as a modulated millimeter wave signal. At these small wave lengths, the short length on-chip or on-package antenna 204 becomes possible.

In one embodiment, the modulated millimeter wave signal to be amplified by the plurality of power amplifiers 206 has a carrier frequency in the range 57-64 GHz if the device in which the transmitter front-end 200 is implemented is intended for operation in the United States or Canada. In another embodiment, the modulated millimeter wave signal to be amplified by the plurality of power amplifiers 206 has a carrier frequency in the range 59-66 GHz if the device in which the transmitter front-end 200 is implemented is intended for operation in Japan.

After power amplification, the impedance transformer and power combiner 208 is configured to combine the amplified millimeter wave signal produced by each of the plurality of power amplifiers 206. Using a plurality of small sized power amplifiers 206, rather than a single large power amplifier, and then combining their respective output signal powers allows the distributed power amplifier 202 to be fully integrated on-chip using, for example, a sub-micrometer CMOS process, while still providing sufficient output power without breaking down devices (e.g., transistors) used to implement the plurality of power amplifiers 206. The impedance transformer and power combiner 208 can also be used to perform an impedance transformation, such that the output impedances of the plurality of power amplifiers 206 substantially match the impedance of the on-chip or on-package antenna 204 to which the power combiner is coupled.

Described below are specific implementations of the transmitter front-end 200 using both an on-chip antenna and an on-package antenna. The immediate section to follow specifically describes the implementation of the transmitter front-end 200 using an on-chip antenna. The section following thereafter then describes the implementation of the transmitter front-end 200 using an on-package antenna.

2. Transmitter Front-End with Distributed Power Amplifier and On-Chip Antenna

Figure 3:
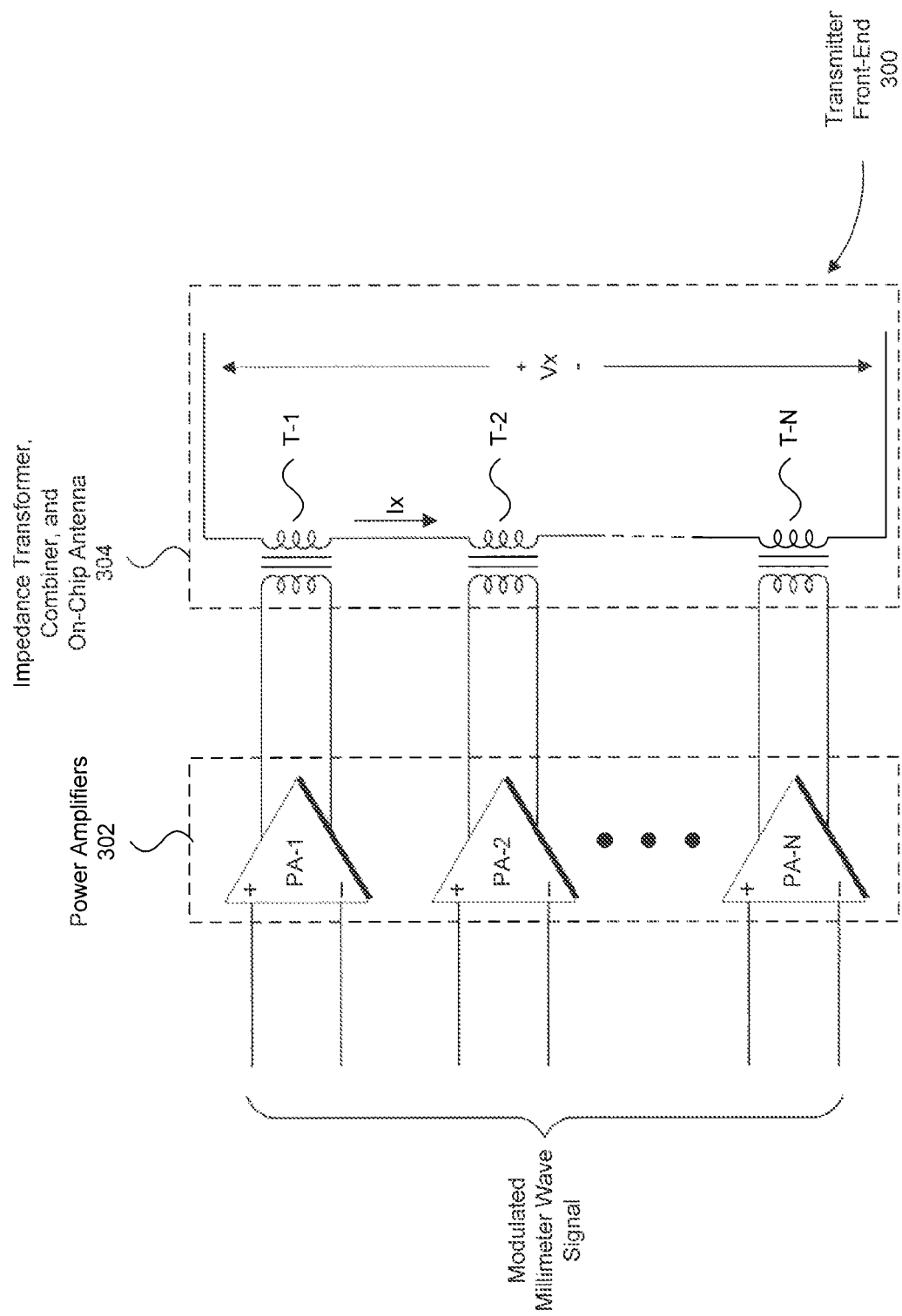
FIG. 3 illustrates a schematic diagram of a transmitter front-end with an on-chip antenna in accordance with embodiments of the present disclosure.

FIG. 3 illustrates a schematic diagram of a transmitter front-end 300 with an on-chip antenna in accordance with embodiments of the present disclosure. The transmitter front-end 300 can be used, for example, to implement one or more of the transmitter front-ends 106-1 through 106-4 in FIG. 1. As shown in FIG. 3, the transmitter front-end includes a plurality of power amplifiers 302 and an impedance transformer and combiner 304. These two modules together form a distributed power amplifier as described above. In addition, the impedance transformer and combiner 304 further includes/forms an on-chip antenna. Thus, the impedance transformer and combiner 304 is aptly labeled in FIG. 3 as the impedance transformer, combiner, and on-chip antenna 304. The transmitter front-end 300 can be fully integrated on-chip.

The plurality of power amplifiers 302 include N differential power amplifiers, PA-1 through PA-N, that are each configured to independently amplify the power of a signal with a carrier frequency in the range of 30 to 300 GHz or above. The signal to be amplified can be modulated with data intended for reception by a nearby IC chip. Signals with frequencies in the range 30 to 300 GHz have a wavelength of ten to one millimeter and are often referred to as millimeter wave signals. Thus, as shown in FIG. 3, the plurality of power amplifiers 302 receive and amplify the power of a signal designated as a modulated millimeter wave signal. At these small wave lengths, a short length on-chip antenna becomes possible.

After power amplification, the impedance transformer and power combiner portion of module 304 is configured to combine the amplified millimeter wave signal produced by each of the plurality of power amplifiers 302. The impedance transformer and power combiner portion of module 304 includes N independent transformers T-1 through T-N. Each of the transformers T-1 through T-N includes a primary winding and a secondary winding. The primary windings of the transformers T-1 through T-N are each coupled to a respective output of one of the plurality of power amplifiers 302, whereas the secondary windings of the transformers T-1 through T-N are coupled together in series. This transformer configuration provides electrical isolation between the outputs of the plurality of power amplifiers 302, while allowing their output signal powers to be added together.

More specifically, the basic ideal transformer equation is given by:

$$\frac{V_S}{V_P} = \frac{N_S}{N_P} = \frac{I_P}{I_S} \quad (1)$$

where $V_P$ and $V_S$ are the respective voltages in the primary and secondary windings of a transformer, $I_P$ and $I_S$ are the respective currents in the primary and secondary windings of the transformer, and $N_S$ and $N_P$ are the respective number of turns in the secondary and primary windings of the transformer. Thus, for example, assuming the plurality of power amplifiers 302 are similarly implemented and produce approximately the same output current $I_P$ and voltage $V_P$ at their respective outputs, it can be shown using EQ. 1 above that the voltage $V_X$ across the two ends of the series combination of secondary windings will be equal to $N*V_s*(N_P/N_S)$, the current $I_X$ flowing through the series combination will be equal to $I_S*(N_S/N_P)$, and the total power in the series combination is equal to $N*V_S*I_S$, which is equal to the sum of the output signal powers of the plurality of power amplifiers 302.

In addition to power combining, the N transformers T-1 through T-N further transform the output impedance of each of the plurality of power amplifiers 302. Specifically, the impedance of each of the plurality of power amplifiers is approximately transformed from an output impedance of $V_P/I_P$ to $V_X/I_X$ or is approximately transformed according to the impedance transformation ratio $(V_P/I_P):(V_X/I_X)$, where $V_P$ and $I_P$ are the output voltage and current of the power amplifier, respectively. Assuming the plurality of power amplifiers 302 are similarly implemented and produce approximately the same output current $I_P$ and voltage $V_P$ at their respective outputs, the impedance transformation ratio simplifies to approximately 1:N, where N is the number of transformers. This impedance transformation can be used to match the typically ideally low output impedance of a power amplifier, to the comparatively higher input impedance of an antenna, which can be, for example, 50 Ohms.

After power combining and impedance transformation, the modulated millimeter wave signal can be wirelessly transmitted using the on-chip antenna further included in module 302 shown in FIG. 3. Specifically, the on-chip antenna is formed by the series combination of secondary windings of the transformers T-1 through T-N. This series combination forms a dipole antenna for radiating the modulated millimeter wave signal to a nearby IC chip. In one embodiment, the antenna is implemented using a metal layer formed on the substrate of the IC chip.

Figure 4:
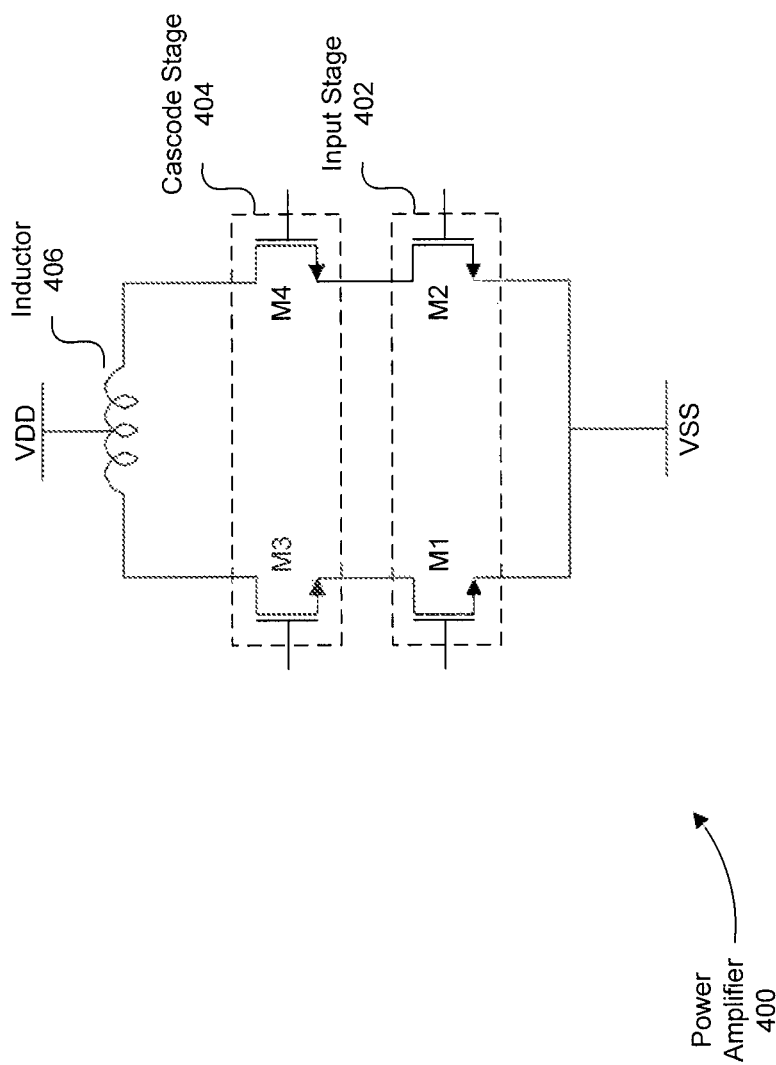
FIG. 4 illustrates an implementation of a power amplifier in accordance with embodiments of the present disclosure.

Referring now to FIG. 4, a schematic of a power amplifier 400 in accordance with embodiments of the present disclosure is illustrated. The power amplifier 400 can be used, for example, to implement one or more of the plurality of power amplifiers 302 in FIG. 3. As shown in FIG. 4, the power amplifier 400 includes a differential input stage 402, a cascode stage 404, and an inductor 406. The differential input stage 402 is implemented using two NMOS transistors and is configured to receive at the gates of the NMOS transistors a differential signal to be amplified. Cascode stage 404 is further implemented using two NMOS transistors and is configured to provide isolation between the input stage 402 and the output of the power amplifier 400, which is taken differentially across the inductor 406. Inductor 406 is generally used to resonate out parasitic capacitances associated with the transistors of the input stage 402. In one embodiment, inductor 406 can be implemented, at least in part, by the primary winding of a transformer in module 304 illustrated in FIG. 3.

It should be noted that the power amplifier 400 is only one example power amplifier that can be used to implement one or more of the plurality of power amplifiers 302 in FIG. 3. Other power amplifier configurations using, for example, different transistors or not using a cascode stage are also possible.

Figure 5:
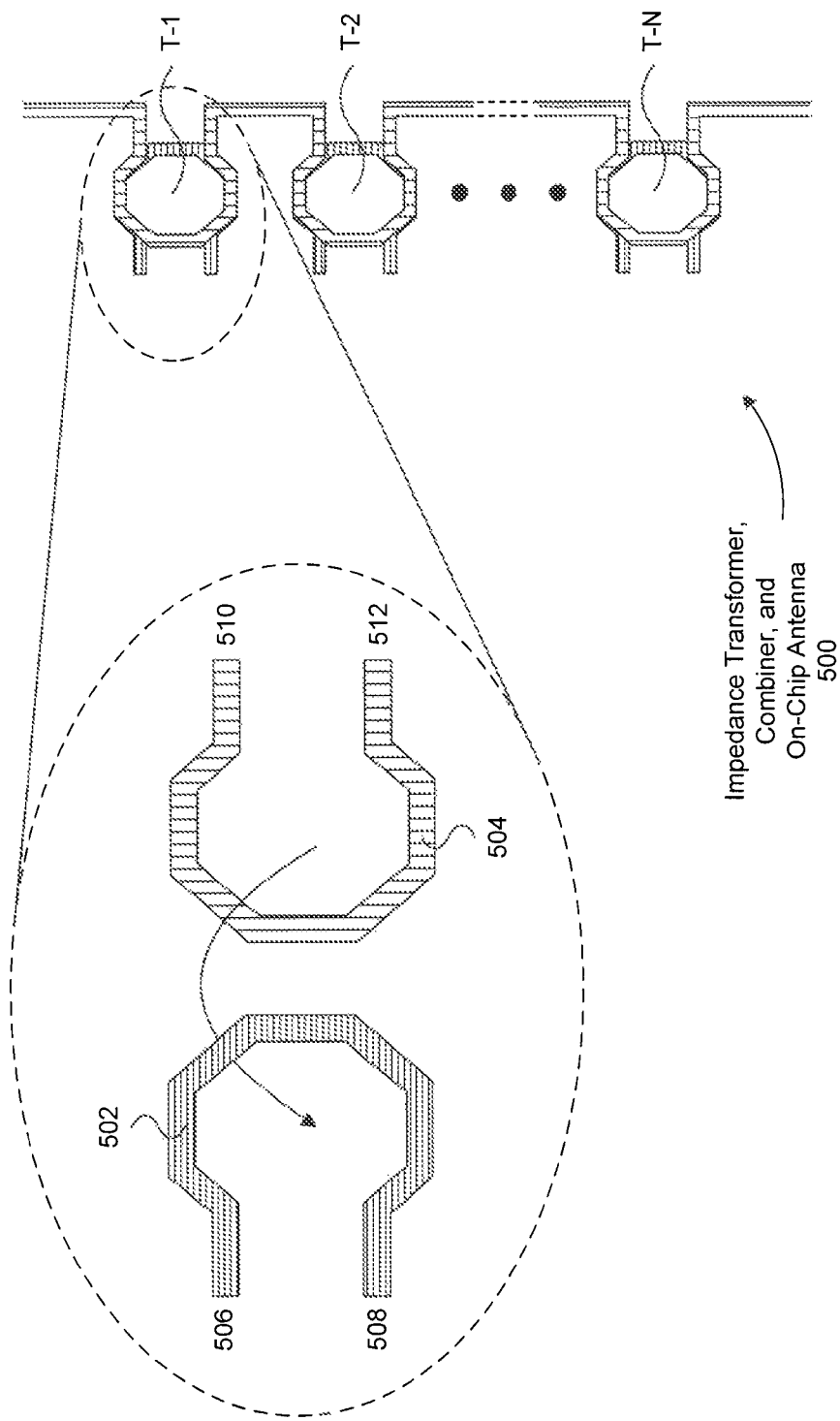
FIG. 5 illustrates a layout of an impedance transformer, power combiner, and on-chip antenna in accordance with embodiments of the present disclosure.

Referring now to FIG. 5, an exemplary integrated circuit layout of an impedance transformer, combiner, and on-chip antenna 500 is illustrated in accordance with embodiments of the present disclosure. The impedance transformer, combiner, and on-chip antenna 500 can be used, for example, to implement the impedance transformer, combiner, and on-chip antenna 300 in FIG. 3.

As shown in FIG. 5, impedance transformer, combiner, and on-chip antenna 500 includes N transformers T-1 through T-N. Each transformer T-1 through T-N includes two spiral inductors that form its windings. This is further illustrated by the blown up illustration of exemplary transformer T-1 shown on the left side of FIG. 5. In the blown up version of the transformer T-1, it can be seen that the transformer T-1 includes a first spiral inductor 502 with two ends 506 and 508, and a second spiral inductor 504 with two ends 510 and 512. Although the two spiral inductors 502 and 504 are shown in FIG. 5 as being laid out flat next to each other for ease of illustration, in actual implementation the two spiral inductors 502 and 504 are stacked, with one of the spiral inductors on top of the other. In an integrated circuit, the two spiral inductors can be stacked by using different metal layers. For example, the spiral inductor 502 can use an eighth metal layer on an integrated circuit substrate, and the spiral inductor 504 can use a ninth metal layer that is positioned above the eighth metal layer on the integrated circuit substrate.

In the embodiment of FIG. 5, spiral inductors 502 and 504 each include only a single loop. In other embodiments, spiral inductor 502 and/or spiral inductor 504 can be implemented with more than one loop.

Figure 6:
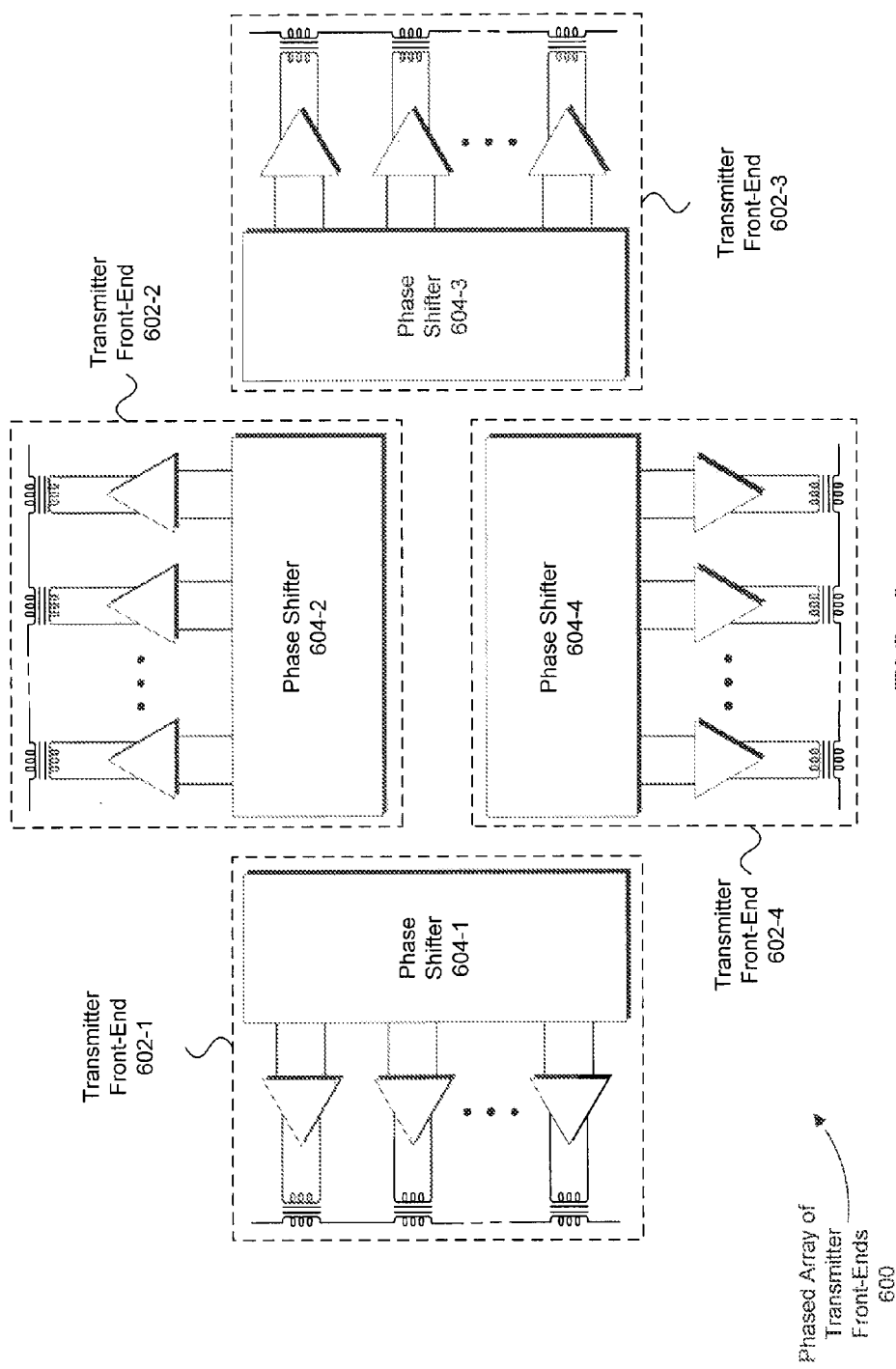
FIG. 6 illustrates a transmitter front-end with distributed power amplifiers and a phased-array of on-chip antennas in accordance with embodiments of the present disclosure.

Referring now to FIG. 6, a phased array of transmitter front-ends 600 is illustrated in accordance with embodiments of the present disclosure. The phased array of transmitter front-ends 600 includes tour transmitter front-ends 602-1 through 602-4 that are each implemented in a substantially similar manner as transmitter front-end 300 illustrated in FIG. 3. However, each transmitter front-end 602-1 through 602-4 includes, in addition to a distributed power amplifier and on-chip antenna as shown, a respective one of phase shifters 604-1 through 604-4. Each transmitter front-end 602-1 through 602-4 is configured to transmit the same modulated millimeter wave signal, albeit with potentially different phases relative to one another.

In specific operation, the phase shifters 604-1 through 604-4 are configured to independently adjust a phase of the modulated millimeter wave signal to be amplified and transmitted by the respective transmitter front-end to which it is coupled. For example, the modulated millimeter wave signals amplified by the plurality of power amplifiers in transmitter front-end 602-1 are configured to be combined, using a combiner made up of transformers as discussed above in FIG. 3, substantially in phase with each other such that they constructively combine before being wirelessly transmitted. Phase shifter 604-1 is configured to modify the phase of this constructively combined signal relative to the constructively combined signal of one or more of the other transmitter front-ends 602-2 through 602-4. By adjusting the relative phases of the constructively combined signals produced and wirelessly transmitted by two or more of the transmitter front-ends 602-1 through 602-4, the wireless transmitted signals can be made to interfere with each other (constructively and destructively) such that the effective radiation pattern of the phased array of transmitter front-ends 600 is reinforced in a desired direction and suppressed in an undesired direction. The desired direction can be, for example, the direction of a nearby IC chip intended to receive the wirelessly transmitted modulated millimeter wave signal, or even the direction of a remotely located device (or IC chip within the remotely located device) several meters or several tens of meters away. This directionality helps to reduce the required output power of the distributed power amplifiers of the transmitter front-end 602-1 through 602-4 and mitigate interference with other potential wireless chip-to-chip communications.

A controller (not shown) can be configured to control the phase shifters 604-1 through 604-4 to provide the desired directionality. The controller can determine the phase shifts based on the relative positioning of the antennas of the transmitter front-ends 602-1 through 602-4 and the desired direction in which the wireless transmitted signal should be directed.

It should be noted that, although four transmitter front-ends 602-1 through 602-4 are shown in FIG. 6, other numbers of transmitter front-ends 602-1 through 602-4 can be used. For example, two transmitter front-ends or six transmitter front-ends can be used.

Figure 7:
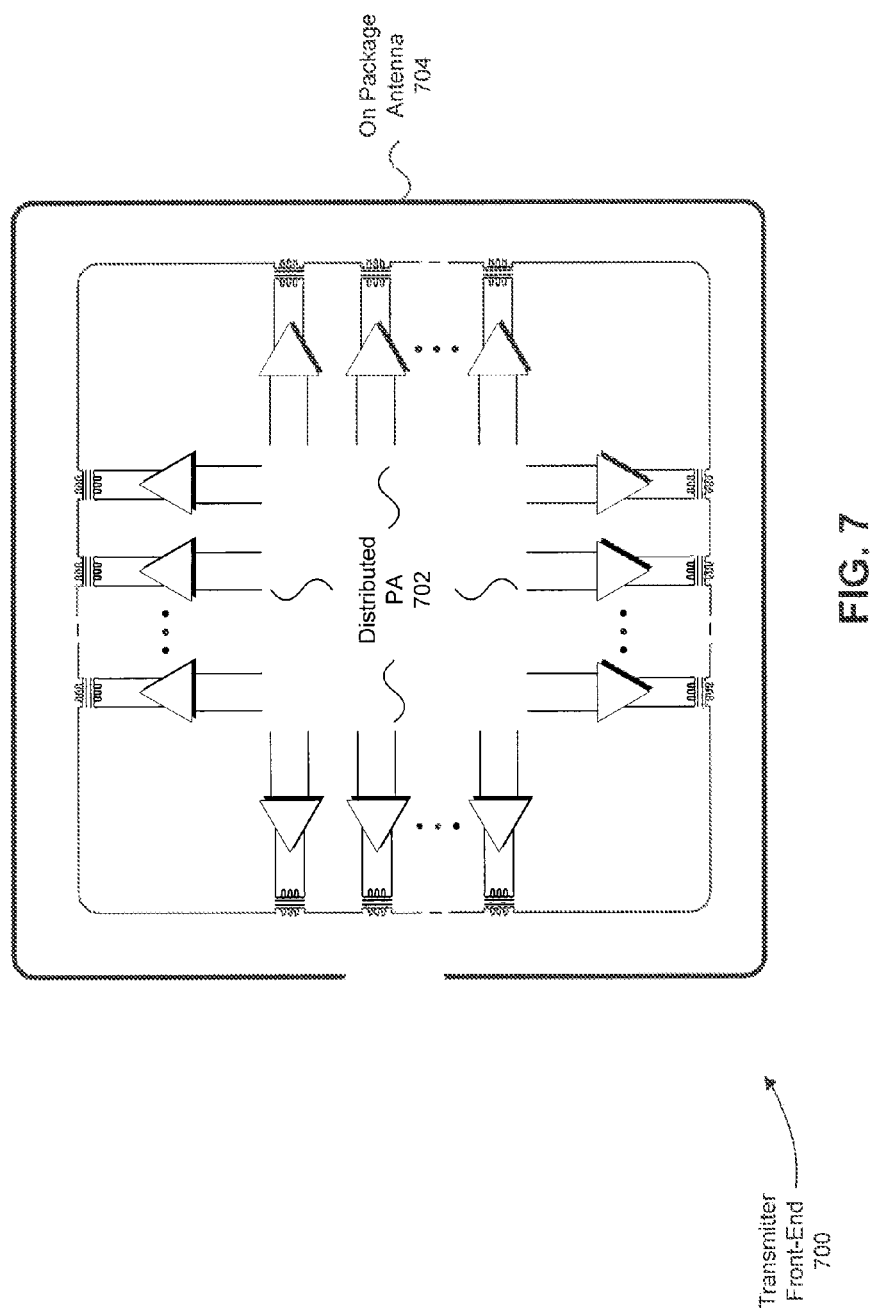
FIG. 7 illustrates a transmitter front-end with distributed power amplifiers and an on-package antenna in accordance with embodiments of the present disclosure.

3. Transmitter Front-End with Distributed Power Amplifier and On-Package Antenna FIG. 7 illustrates a schematic diagram of a transmitter front-end 700 with an on-package antenna in accordance with embodiments of the present disclosure. The transmitter front-end 700 can be used, for example, to implement one or more of the transmitter front-ends 106-1 through 106-4 in FIG. 1.

As shown in FIG. 7, the transmitter front-end includes a distributed power amplifier 702 for amplifying the power of a modulated millimeter wave signal to be wireless transmitted to a nearby IC chip, or even to a remotely located device (or IC chip within the remotely located device) several meters or several tens of meters away. The distributed power amplifier 702 is substantially similar to the distributed power amplifier 302 described above in FIG. 3 and includes a plurality of power amplifiers and an impedance transformer and combiner made up of transformers. Each of the primary windings of the transformers are coupled to a respective output of one of the plurality of power amplifiers, and the secondary windings of the transformers are coupled together in a loop configuration as shown in FIG. 7. This loop is configured to inductively couple the combined output signal power of the power amplifiers in the distributed power amplifier 702 to an on package antenna 704. The on package antenna 704 forms a dipole antenna that is configured to radiate the combined output signal power such that a nearby IC chip can receive the radiated signal.

4. Conclusion

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

What is claimed is:

1. A transmitter front-end for wireless communications, the transmitter front-end comprising:

an antenna included within an array of antennas integrated on a chip;

a phase shifter configured to adjust a phase of a signal to be transmitted by the antenna to provide a phase adjusted signal such that an effective radiation pattern of the array of antennas on the chip is reinforced in a desired direction and suppressed in undesired directions;

a first power amplifier configured to amplify the phase adjusted signal for transmission by the antenna to provide a first amplified version of the phase adjusted signal at an output of the first power amplifier;

a second power amplifier configured to amplify the phase adjusted signal for transmission by the antenna to provide a second amplified version of the phase adjusted signal at an output of the second power amplifier; and an impedance transformation and power combining module comprising a first transformer and a second transformer, wherein a primary winding of the first transformer is coupled to the output of the first power amplifier, a primary winding of the second transformer is coupled to the output of the second power amplifier, and a secondary winding of the first transformer is coupled in series with a secondary winding of the second transformer, wherein the secondary winding of the first transformer and the secondary winding of the second transformer form, at least in part, the antenna.

2. The transmitter front-end of claim 1, wherein the antenna is coupled to the secondary winding of the first transformer and to the secondary winding of the second transformer.

3. The transmitter front-end of claim 1, wherein the primary winding of the first transformer is configured to resonate out parasitic capacitances associated with the first power amplifier.

4. The transmitter front-end of claim 1, wherein both the primary winding of the first transformer and the secondary winding of the first transformer are implemented using spiral inductors on the chip.

5. The transmitter front-end of claim 1, wherein the antenna is a dipole antenna.

6. The transmitter front-end of claim 1, wherein the signal has a wavelength of ten millimeters to one millimeter.

7. A transmitter front-end for wireless communications, the transmitter front-end comprising:

an antenna integrated on a package of a chip;

a first power amplifier configured to amplify a signal for transmission by the antenna to provide a first amplified version of the signal at an output of the first power amplifier;

a second power amplifier configured to amplify the signal for transmission by the antenna to provide a second amplified version of the signal at an output of the second power amplifier; and an impedance transformation and power combining module comprising a first transformer and a second transformer, wherein a primary winding of the first transformer is coupled to the output of the first power amplifier, a primary winding of the second transformer is coupled to the output of the second power amplifier, and a secondary winding of the first transformer is coupled in series with a secondary winding of the second transformer to form a series connection, wherein the series connection is configured to magnetically couple the impedance transformation and power combining module to the antenna.

8. The transmitter front-end of claim 7, wherein the primary winding of the first transformer is configured to resonate out parasitic capacitances associated with the first power amplifier.

9. The transmitter front-end of claim 7, wherein both the primary winding of the first transformer and the secondary winding of the first transformer are implemented using spiral inductors on the chip.

10. The transmitter front-end of claim 7, wherein the antenna is a dipole antenna.

11. The transmitter front-end of claim 7, wherein the signal has a wavelength of ten millimeters to one millimeter.

12. A transmitter front-end for wireless communications, the transmitter front-end comprising:

an antenna included within an array of antennas integrated on a chip;

a phase shifter configured to adjust a phase of a signal to be transmitted by the antenna to provide a phase adjusted signal such that an effective radiation pattern of the array of antennas on the chip is reinforced in a desired direction and suppressed in undesired directions; and an impedance transformation and power combining module comprising a first transformer and a second transformer, wherein a primary winding of the first transformer is coupled to an output of a first power amplifier configured to amplify the phase adjusted signal, a primary winding of the second transformer is coupled to an output of a second power amplifier configured to amplify the phase adjusted signal, and a secondary winding of the first transformer is coupled in series with a secondary winding of the second transformer, wherein the secondary winding of the first transformer and the secondary winding of the second transformer form, at least in part, the antenna.

13. The transmitter front-end of claim 12, wherein the antenna is coupled to the secondary winding of the first transformer and to the secondary winding of the second transformer.

14. The transmitter front-end of claim 12, wherein the primary winding of the first transformer is configured to resonate out parasitic capacitances associated with the first power amplifier.

15. The transmitter front-end of claim 12, wherein both the primary winding of the first transformer and the secondary winding of the first transformer are implemented using spiral inductors on the chip.

16. The transmitter front-end of claim 12, wherein the antenna is a dipole antenna.

17. The transmitter front-end of claim 12, wherein the signal has a wavelength of ten milimeters to one millimeter.

18. The transmitter front-end of claim 12, wherein the signal has a carrier frequency in a range of 57-64 Gigahertz.

19. The transmitter front-end of claim 12, wherein the signal has a carrier frequency in a range of 59-66 Gigahertz.

20. The transmitter front-end of claim 12, wherein the signal has a carrier frequency in a range of 30-300 Gigahertz.

* * * * *

UNITED STATES PATENT AND TRADEMARK OFFICE
CERTIFICATE OF CORRECTION

PATENT NO. : 8,918,064 B2
APPLICATION NO. : 13/628488
DATED : December 23, 2014
INVENTOR(S) : Shirinfar et al.

It is certified that error appears in the above-identified patent and that said Letters Patent is hereby corrected as shown below:

In the claims,

In column 10, line 49, please replace "ten milimeters" with --ten millimeters--.

Signed and Sealed this
Twelfth Day of May, 2015

Michelle K. Lee
*Director of the United States Patent and Trademark Office*